United States Patent [19]

Owens et al.

[11] Patent Number: 5,849,025

[45] Date of Patent: Dec. 15, 1998

[54] ELECTROCHEMICAL CAPACITOR FOR IMPLANTABLE MEDICAL DEVICE

[75] Inventors: Boone B. Owens, Wrightsville Beach, N.C.; James M. Speckien, Vadnais Heights, Minn.

[73] Assignee: Medtronic, Inc, Minneapolis, Minn.

[21] Appl. No.: 882,425

[22] Filed: Jun. 25, 1997

Related U.S. Application Data

[60] Continuation-in-part of Ser. No. 459,918, Jun. 2, 1995, Pat. No. 5,646,815, which is a division of Ser. No. 984,133, Dec. 1, 1992, abandoned.

[51] Int. Cl.$^6$ ................................................ A61N 1/378
[52] U.S. Cl. .................................................................. 607/5
[58] Field of Search ................................. 607/4, 5, 6, 7, 607/8; 361/502, 504, 505, 525, 523

[56] References Cited

U.S. PATENT DOCUMENTS

| | | | |
|---|---|---|---|
| 3,419,790 | 12/1968 | Raleigh . | |
| 4,327,400 | 4/1982 | Muranaka et al. | 361/433 |
| 4,609,971 | 9/1986 | Shaffer | 361/433 |
| 4,638,407 | 1/1987 | Lundsgaard | 361/433 |
| 4,683,639 | 8/1987 | Maesaka et al. | 29/570.1 |
| 4,730,239 | 3/1988 | Currie et al. | 361/433 |
| 4,748,542 | 5/1988 | Lundsgaard | 361/433 |
| 4,792,504 | 12/1988 | Schwab et al. | 429/192 |
| 4,830,939 | 5/1989 | Lee et al. | 429/192 |
| 5,080,963 | 1/1992 | Tatarchuk et al. | 428/225 |

FOREIGN PATENT DOCUMENTS

| | | |
|---|---|---|
| 0 212 572 A2 | 8/1986 | European Pat. Off. . |
| 55817 | 3/1989 | Japan . |
| 14506 | 1/1990 | Japan . |
| 39513 | 2/1990 | Japan . |
| 2 201 287 | 8/1988 | United Kingdom . |
| 424827 A1 | 8/1988 | United Kingdom . |

OTHER PUBLICATIONS

"Li+–Conductive Solid Polymer Electrolytes with Liquid–Like Conductivity" by Abraham et al. In J. Electrochem. Socl., vol. 137, No. 5, May 1990.

Room Temperature Polymer Electrolyte Batteries: by Abraham et al.

"Synthesis of Ionic Conducting Interpenetrating Polymer Networks" by Chiang et al in Polymer Communications, 1987, vol. 28, Feb.

"New Directions in Polymer Electrolyte Battery Technology" by Barnett et al.

"Conductivity of Electrolyte for rechargeable Lithium Batteries" by Dudley et al. In Journal of Power Sources, 35 (1991) pp. 59–82.

"New Conducting Polymer Networks" by Z. Andrieu, J.P. Boeuve, France, pp. 253–254.

"Some Recent Studies with the Solid–Ionomer Electrochemical Capacitor" by Sarangapani et al. In Journal of Power Sources, 36(1991) pp. 341–361.

"Metal–Carbon Composite Electrodes from Fiber Precursors" by Kohler et al. In Journal Electrochem. Soc., vol. 137, No. 6, Jun. 1990.

"New Solid–State Electric Double–Layer Capacitor Using Poly (Vinyl Alcohol)–Based Polymer Solid Electrolyte" by Kanbara et al. In Journal of Power Sources 36 (1991) pp. 87–93.

(List continued on next page.)

*Primary Examiner*—Scott M. Getzow
*Attorney, Agent, or Firm*—Thomas F. Woods; Harold R. Patton

[57] ABSTRACT

A hermetically sealed medical device such as a cardioverter is disclosed, where the device contains an electrochemical capacitor having at least one electrode formed from a particularly efficacious electrode material. In one embodiment of the present invention, the electrode material comprises electrically conductive carbon, a soluble salt, a non-aqueous liquid solvent and a gel-former. The electrode material of the present invention is especially well adapted for use in multi-layer capacitors in which very thin layers are desirable. The thin layers of the electrochemical capacitor of the present invention are characterized in having very low electrical resistance, and thus permit the capacitor to be discharged very rapidly.

40 Claims, 3 Drawing Sheets

OTHER PUBLICATIONS

"Laboratory Testing of High Energy Density Capacitors for Electric Vehicles" by A.F. Burke, Oct. 1991, by EG&G Idaho, Inc.

"Solid State Electrochemical Capacitors: Ultrathin Electrolyte Devices" presented at an International Seminar on Double Layer Capacitors and Similar Energy Storage Devices by Boone B. Owens, 1991.

"A Study of Carbons and Graphite Anodes for Lithium Rechargeable Cells" by Mary Elizabeth Bolter of R&D Center, SAFT America, Inc., 1991.

"High Voltage Capacitors for Implantable Defibrillators" by K. McNeil et al., of Internedica, Inc., Freeport, TX.

"Power Capacitor Requirement for Electric Vehicles" by Haskins et al. Of the Electric Vehicle Program, Ford Motor Company, Dearborn, Michigan, 1991.

"Assessment of Thin Film Batteries Based on Polymer Electrolytes" by Munshi et al. In Solid State Ionics 28 (1990) pp. 87–94.

"The U.S. Navy's Lithium Rechargeable Battery Programme Part 1: Development of a Lithium Colbolt Oxide Prototype Cell" by P. Smith et al. (1992).

"Activated Carbon/Carbon Composite of 1000F Electric Double layer Capacitor" by Tabuchi et al., NEC Corp. (1991).

"Overview of Double layer Capacitor Technology" by Anthony Trippe of Maxwell Laboratories, Inc. (1992).

"Fabrication and Activation Studies of Conducting Plastic Composite Electrodes for Redox Cells" by Zhong et al in Journal of Power Sources, 36 (1991) pp. 29–43.

FIG. 4

ELECTROCHEMICAL CAPACITOR FOR IMPLANTABLE MEDICAL DEVICE

CROSS-REFERENCE TO RELATED APPLICATIONS

This patent is a continuation-in-part of, incorporates by reference herein in their respective entireties, and claims the benefit of the filing and priority dates corresponding to co-pending divisional U.S. Pat. application Ser. No. 08/459, 918 filed Jun. 2, 1995 to Boone et al. is U.S. Pat. No. 5,646,815 entitled "Electrochemical Capacitor and Electrode," and divisional U.S. patent application Ser. No. 07/984,133 filed Dec. 1, 1992 to Boone et al. now abandoned entitled "Electrochemical Capacitor and Electrode."

FIELD OF THE INVENTION

This invention relates to electrochemical capacitors, and especially to solid state capacitors having a plurality of electrodes and electrolyte layers for use in implantable medical devices such as defibrillators, pacemakers, pacemaker-cadioverter-defibrillators (PCDs), implantable pulse generators (IPGs) and the like.

BACKGROUND OF THE INVENTION

Electrochemical capacitors generally fall into two broad categories: (1) double layer capacitors which rely solely on interfacial charge separation across the electrical double layer, and (2) pseudocapacitors which have enhanced charge storage derived mainly from Faradaic transfer parallel with the double layer. Both types of capacitor offer major increases in capacitance density and energy storage capability when compared with conventional dielectric capacitors. They have the potential for extremely low values of electrical leakage unsurpassed by any other capacitive energy storage device. Electrochemical capacitors bridge the energy and power gap between batteries and capacitors. At the same time, they can exhibit both the cycle life and the stability expected of passive components.

In double layer capacitors, the components of the double layer capacitance are in electrical series leading to the equation:

$$1/C_{Total} = 1/C_H + 1/C_D,$$

where $C_H$ and $C_D$ are the Helmholtz and diffuse layer capacitances, respectively. If $C_D$ is large, as for example at high electrolyte concentrations, then the effective capacitance of the interface is more nearly equal to the Helmholtz capacitance.

Conversely, when $C_D$ is low, as it will be at low concentrations, then the total capacitance tends to this value. Since concentrated electrolytes are utilized in electrochemical capacitors in order to achieve minimum resistance or ESR, the original Helmholtz concept will generally yield the more accurate values of capacitance. Since the charge or discharge of the double layer involves only a dipole reorientation process, it is a very rapid electrode reaction.

When, on the other hand, charge storage is dependent on a charge transfer process, the kinetics will tend to be slower, and can be governed by diffusion in instances where chemical species from the bulk of either the electrode or the electrolyte are involved. Charge cannot leak across the double layer except by a charge transfer process. As a result, electrical leakage in double layer capacitors is intrinsically absent.

Pseudocapacitance is in parallel with the components of true double layer capacitance and thus gives rise to the possibility of considerably enhanced charge storage. Electrical response of a pseudocapacitor can often closely resemble that of a conventional double layer capacitor over a wide range of potential between the cathodic and anodic limits of electrolyte decomposition. The apparent DC capacitance (really the true double layer capacitance plus the pseudocapacitance) can be derived from triangular sweep/voltage curves by the equation:

$$C = idt/dV$$

The integral capacitance can be readily determined by means of constant current charging curves. The materials used in a pseudocapacitive couple include electrode materials that can be prepared in a stable, high surface area form and materials capable of undergoing reversible surface and or near-surface charge transfer reactions at relatively constant voltages. Certain of the conducting transition metal oxides, notably $RuO_2$ and $IrO_2$, have been found to fulfill these requirements. The clear advantage inherent in the use of a pseudocapacitive material for high rate, high energy density electrochemical capacitors is in the significantly higher capacitance densities achievable in comparison to those employed in double layer capacitors.

The main design parameters to be considered in the selection of an electrochemical energy storage capacitor are voltage, capacitance, density, ESR, leakage current, and energy density. Other significant parameters are the load and charge-back profiles, duty cycle and repetition rate. The electrical means of coupling the capacitor with the load must also be defined.

The energy stored in a capacitor is given by the simple formula:

$$\tfrac{1}{2} CV^2$$

The basic equations relating voltage and time for the charge and discharge of a capacitor, which in turn govern power output, are:

$$V_t = V_o(1 - e^{-t/RC}) \text{ (charge)}$$

$$V_t = V_o e^{-t/RC} \text{ (discharge)},$$

where R is the equivalent series resistance (ESR). Maximum current and power levels are achieved by devices possessing the lowest value of ESR and the highest voltages. For constant coulomb charges in a device, the energy stored is directly proportional to voltage because $\tfrac{1}{2} CV^2$ equals $\tfrac{1}{2} QV$.

Solid state electrochemical capacitors can be made using solid state electrolytes in place of more conventional liquid electrolyte materials. The advantages sought in solid state capacitors include the elimination of electrolyte leakage, improved operation at high and low temperatures, elimination of the need for a discrete separator element, increased ease of miniaturization, multiple shape factors and the possibility of simple reliable designs for bipolar electrode cell stacks to allow fabrication of high voltage devices.

The major problem with solid electrolytes is that they have much higher electrical resistances than liquid electrolytes, resulting in relatively high values of ESR for solid state capacitors. Typically, the conductivity of liquid electrolytes exceeds that of solid electrolytes by several orders of magnitude. Such low conductivity means that although the capacitor may have the ability to store a great deal of energy per unit volume, the time to discharge the energy stored in the capacitor is quite long and may make the capacitor unsuitable for many electronic applications for which the stored energy must be supplied at high voltages in milliseconds rather than in seconds or minutes. Since high voltages require multi-layer designs with cells connected in series, even a very low ESR for a cell can amount to an unacceptable ESR for the entire device. One example of such an application is the implantable heart defibrillator where high voltages (e.g. 800 volts) must be delivered from a capacitor within 5–15 milliseconds.

The conductivity issue has been addressed by the development of improved conductive polymeric electrolyte materials in both capacitors and batteries.

For example, in U.S. Pat. Nos. 4,618,407 and 4,748,542 to Lundsgaard a polymer such as polyethylene oxide is rendered ionically conductive by the addition of an inorganic salt such as $LiClO_4$, $NaClO_4$, $LiCF_3SO_3$, or $LiBF_4$, and then combined with activated carbon-containing electrodes to produce a multi-layer solid-state electrochemical capacitor. In U.S. Pat. No. 4,830,939 to Lee et al. a solid electrolyte for electrochemical cells is formed by mixing a liquid polymerizable compound, a radiation inert ionically conducting liquid and an ionizable alkaline metal salt and subjecting those components to polymerizing radiation.

In Abraham et al., Li+-Conductive Solid Polymer Electrolytes with Liquid-Like Conductivity, J. Electrochem. Soc., Vol 137, No. 5, May 1990, a polymer network of polyacrylonitrile, poly(tetraethylene glycol diacrylate) or poly(vinyl pyrrolidone) is disclosed to immobilize a liquid solvent such as ethylene carbonate or propylene carbonate and a lithium salt. In a paper by Abraham (Room Temperature Polymer Electrolyte Batteries presented at the Fourth International Rechargeable Battery Seminar in Florida in March 1992), additional polymer networks using poly(bis-((methoxy ethoxy) ethoxy) phosphazene), poly(propylene oxide), and poly(ethylene oxide) are disclosed. In Kanbara et al., a new solid-state electric double-layer capacitor using poly(vinyl alcohol)-based polymer solid electrolyte, Journal of Power Sources 36 (1991) 87–93 PVA was disclosed as dissolving large amounts of lithium salts to provide a solid-state electrolyte with good conductivity for double layer capacitors. In U.S. Pat. No. 4,792,504 to Schwab et al., a solid polymer electrolyte is disclosed with a continuous network of polyethylene oxide containing a dipolar aprotic solvent and a metal salt.

Another component of electrochemical capacitors that has received attention is the electrode. Carbon electrodes have been studied extensively. Carbon black has the drawback of high resistivity arising out of poor particle-to-particle contact. However, since the energy density of the capacitor is directly proportional to accessible surface area of electrode materials and since carbon black is known as an electrode material that may have surface areas in the range of 1000–2000 $m^2/g$, it is still highly desirable for electrochemical capacitor applications. The conductivity of solid state electrochemical capacitor electrodes can be enhanced by adding to the carbon a sulfuric acid aqueous solution such as that used in double layer capacitors sold under the tradename SUPERCAP by Nippon Electric Company (NEC).

Conductivity can also be improved by including in the carbon electrode an ionically conducting polymer (e.g. polyethylene oxide) and an inorganic salt as set forth in U.S. Pat. Nos. 4,618,407 and 4,748,542 to Lundsgaard. Also, in Japanese Kokai Patent Application No. HEI 2 [1990]-39513, carbon is impregnated with a polymeric solid electrolyte made with a solid solution of a polyether polymer and an alkali metal salt. However, carbon electrodes using these solid electrolytes still lack the conductivity needed for many double layer capacitor applications.

It is therefore an object of the present invention to provide an electrochemical capacitor with improved ESR for use in an implantable medical device such as a defibrillator or cardioverter.

It is also an object of the present invention to provide a high voltage, multi-layer electrochemical capacitor with an improved ESR for use in an implantable medical device such as a defibrillator or cardioverter.

SUMMARY OF THE INVENTION

These and other objects are accomplished by the present invention. We have discovered an improved electrode material for an electrochemical capacitor, a multi-layer capacitor employing an improved electrode material and a method for making the improved electrode material and electrochemical capacitor. The capacitor and electrode of the present invention are employed particularly advantageously in implantable medical devices such as defibrillators.

The thin layers of the electrochemical capacitor of the present invention are characterized in having very low electrical resistance, and thus permit the capacitor to be discharged very rapidly. Additionally, the electrochemical capacitor of the present invention has a high charge density, thereby permitting smaller and lighter capacitors to be constructed for use in implantable cardioverters and the like. Low volume and low weight are highly desirable attributes of the various components disposed within such implantable medical devices.

The electrode material of the electrochemical capacitor of the present invention preferably comprises at least 5 weight percent of an electrically conductive carbon having a surface area greater than 200 $m^2/g$, a soluble salt, a non-aqueous liquid solvent, and a gel-former. The electrically conductive carbon can be, for example, activated carbon, carbon black or a mixture of activated carbon and carbon black. The soluble salt can be an alkali metal salt such as the lithium salts $LiClO_4$, $LiAsF_6$, $LiPF_6$, $LiCF_3SO_3$ or $LiBF_4$, similar salts of sodium, potassium or magnesium, alkaline earth salts, and organic substituted ammonium cation salts and other organic substituted onium salts. The non-aqueous liquid solvent can be a low molecular weight polar solvent such as, for example, ethylene carbonate or propylene carbonate or, preferably a mixture of ethylene carbonate and propylene carbonate. The gel-former is preferably an acrylonitrile-based polymer although polymers such as polyvinylpyrrolidone (PVP) or poly(tetraethylene glycol) diacrylate (PEGDA) could also be used.

The electrode material can be made by mixing electrically conductive carbon with the non-aqueous liquid solvent and then mixing the resulting mixture with a gelled composite material comprising a soluble salt, a non-aqueous liquid solvent and a gel-former. The final mixture can be degassed in a vacuum to remove volatile impurities and then formed into a film by casting or pressing methods. A conductive current collector can then be pressed onto the film to make a completed electrode structure.

Electrodes of this type can be used to make solid electrochemical capacitors. Such capacitors have at least two electrodes, where at least one electrode has the composition described above and also at least one ionically conductive electrolyte layer in contact with the electrode layers to serve as both a separator and as the electrolyte. The electrolyte layer preferably comprises an alkali metal salt and a polymer. An electrolyte composition such as that disclosed in U.S. Pat. Nos. 4,618,407 and 4,748,542 to Lundsgaard may be used to in the electrolyte layer.

Such solid electrochemical capacitor components are especially well adapted for use in multi-layer capacitors in which a plurality of electrode layers, a plurality of electrolyte layers, and a plurality of current collectors are used in an operative relationship. The collector elements can be connected electrically in series or in parallel. If connected in series, the capacitor can provide a high output voltage. Capacitors having such components can be made very thin, thereby providing a very low ESR for the device and permitting rapid discharge of the capacitor.

DETAILED DESCRIPTION OF THE PREFERRED EMBODIMENTS

Figure 1:
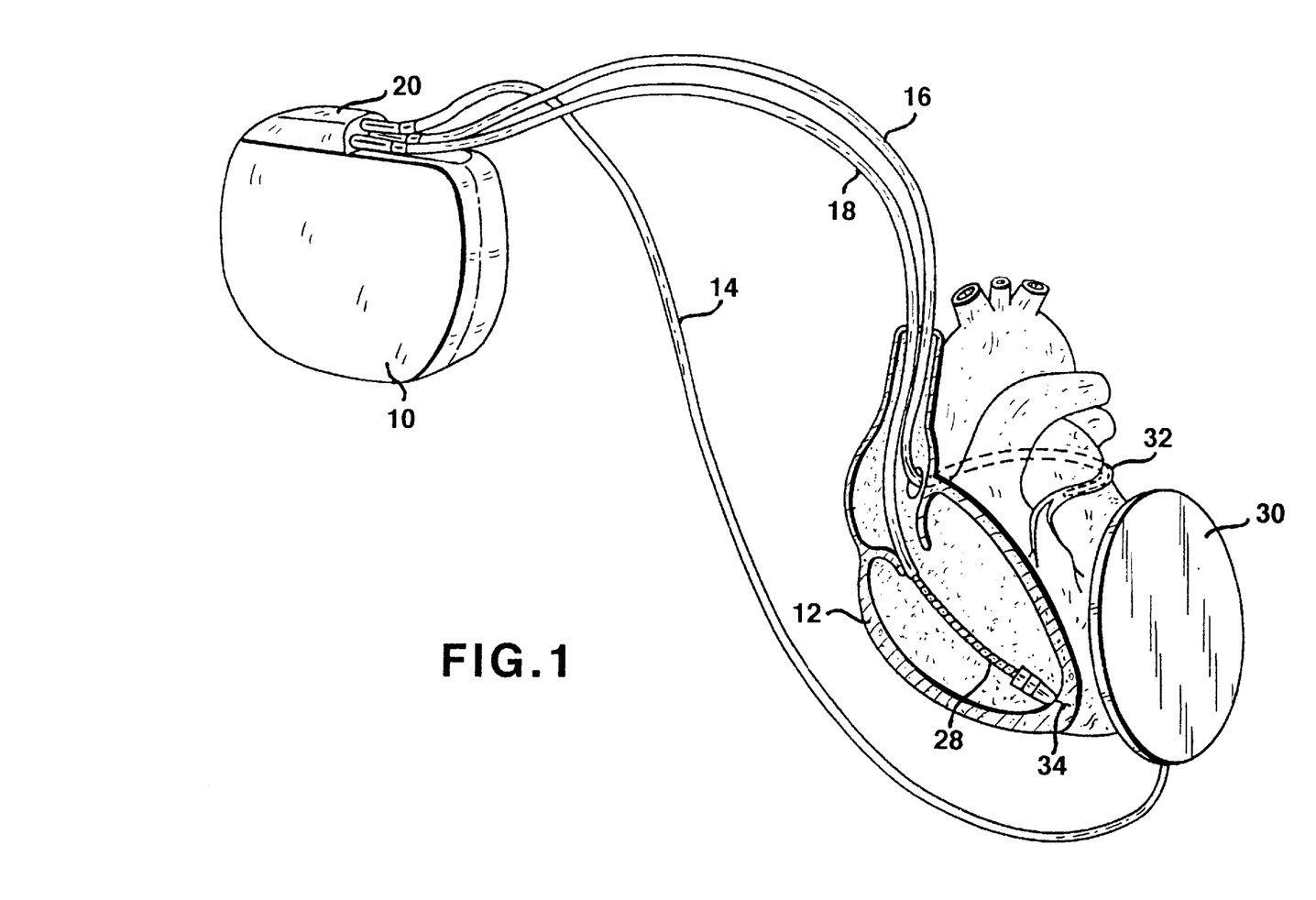
FIG. 1 is a drawing illustrating the physical components of a cardioverter and cardioversion lead system of the type in which the present invention may be advantageously practiced.

FIG. 1 illustrates an implantable pacemaker/cardioverter/defibrillator 10, its associated electrical leads 14, 16 and 18, and their relationship to human heart 12. The leads are coupled to the pacemaker/cardioverter/defibrillator 10 by means of multi-lumen connector block 20, which contains separate connector ports for each of the three leads illustrated. Lead 14 is coupled to subcutaneous electrode 30, which is intended to be mounted subcutaneously in the region of the left chest. Lead 16 is a coronary sinus lead employing an elongated coil electrode which is located in the coronary sinus and great vein region of the heart. The location of the electrode is illustrated in broken line format at 32, and extends around the heart from a point within the opening of the coronary sinus to a point in the vicinity of the left atrial appendage.

Lead 18 is provided with an elongated electrode coil 28 which is located in the right ventricle of the heart. Lead 18 also includes a stimulation electrode 34 which takes the form of an advanceable helical coil which is screwed into the myocardial tissue of the right ventricle. Lead 18 may also include one or more additional electrodes for near and far field electrogram sensing. A more detailed description of the leads illustrated can be found in U.S. Pat. No. 4,932,407 issued to Williams on Jun. 12, 1990, incorporated by reference herein in its entirety. However, the invention is also believed to be workable in the context of multiple electrode systems employing different sets of electrodes, including superior vena cava electrodes and epicardial patch electrodes.

In the system illustrated, cardiac pacing pulses are delivered between helical electrode 34 and elongated electrode 28. Electrodes 28 and 34 are also employed to sense electrical signals indicative of ventricular contractions. As illustrated, it is anticipated that the right ventricular electrode 28 will serve as the common electrode during sequential and simultaneous pulse multiple electrode defibrillation regimens. For example, during a simultaneous pulse defibrillation regimen, pulses would simultaneously be delivered between electrode 28 and electrode 30 and between electrode 28 and electrode 32.

During sequential pulse defibrillation, it is envisioned that pulses would be delivered sequentially between subcutaneous electrode 30 and electrode 28 and between coronary sinus electrode 32 and right ventricular electrode 28. Single pulse, two electrode defibrillation pulse regimens may be also provided, typically between electrode 28 and coronary sinus electrode 32. Alternatively, single pulses may be delivered between electrodes 28 and 30. The particular interconnection of the electrodes to the implantable pacemaker/cardioverter/defibrillator will depend somewhat on which specific single electrode pair defibrillation pulse regimen is believed more likely to be employed.

Figure 2:
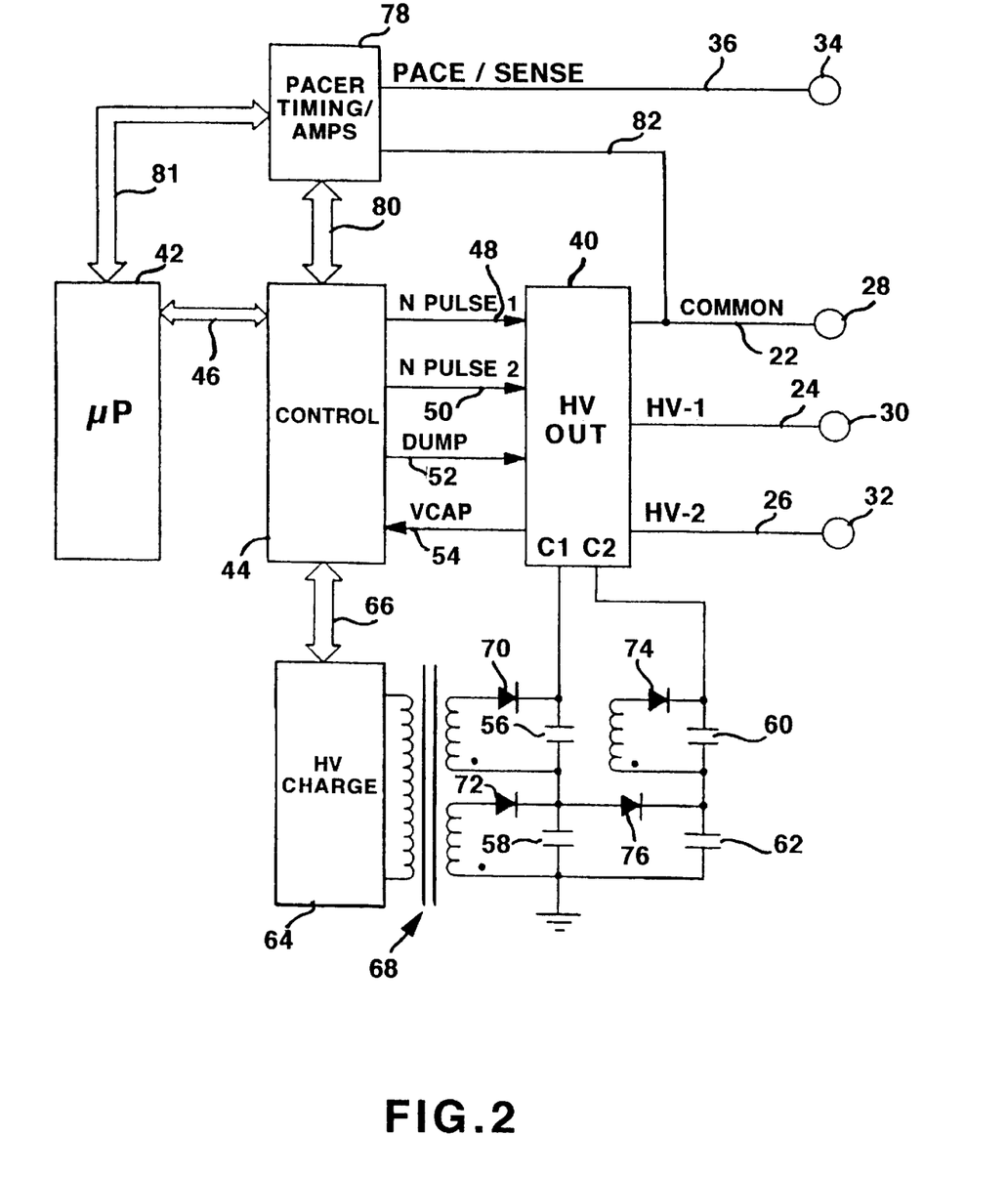
FIG. 2 is a block functional diagram illustrating the interconnection of one embodiment of the circuitry and capacitor of the present invention with the primary functional components of an implantable cardioverter/pacemaker.

FIG. 2 is a block diagram illustrating the interconnection of an output circuit 40 according to the present invention with a prior art hermetically sealed implantable pacemaker/cardioverter/defibrillator. As illustrated, the device is controlled by means of a stored program in microprocessor 42, which performs all necessary computational functions within the device. Microprocessor 42 is linked to control circuitry 44 by means of a bi-directional data/control bus 46, and thereby controls operation of the output circuitry 40 and the high voltage charging circuitry 64. The implantable pacemaker/cardioverter/defibrillator contains a battery for providing electrical power thereto. Moreover, the battery provides electrical power to circuit 40 of the present invention.

On reprogramming of the device or on the occurrence of signals indicative of delivery of cardiac pacing pulses or of the occurrence of cardiac contractions, pace/sense circuitry 78 will awaken microprocessor 42 to perform any necessary mathematical calculations, to perform tachycardia and fibrillation detection procedures and to update the time intervals controlled by the timers in pace/sense circuitry 78. The basic operation of such a system in the context of an implantable pacemaker-cardioverter-defibrillator may correspond to any of the systems known to the art, and in more particular may correspond generally to those illustrated in U.S. Pat. No. 4,548,209 to Wielders et al., U.S. Pat. No. 4,693,253 to Adams, U.S. Pat. No. 4,375,817 to Engle et al., U.S. Pat. No. 4,384,585 to Zipes, and U.S. Pat. No. 4,830,006 to Haluska et al., all of which are incorporated by reference herein in their respective entireties.

The control circuitry 44 provides three signals of primary importance to the output circuitry 40 of the present invention. These include the first and second control signals discussed above, labeled here as NPULSE-1, line 48, and NPULSE-2, line 50. Also of importance is DUMP line 52 which initiates discharge of the output capacitors and VCAP line 54 which provides a signal indicative of the voltage stored on the output capacitors 56, 58, 60, 62, to the control circuitry 44. The defibrillation electrodes 28, 30 and 32 illustrated in FIG. 1, above, are shown coupled to the output circuitry 40 by means of conductors 22, 24 and 26. For ease of understanding, these conductors are also labeled as "COMMON", "HV-1" and "HV-2".

Other configurations are also possible, however. For example, subcutaneous electrode 30 may be coupled to HV-2 conductor 26, to allow for a single pulse regimen to be delivered between electrodes 28 and 30. As discussed in the Summary of the Invention section, during a logic signal on NPULSE-1 line 48, a pulse is delivered between electrode 30 and electrode 28. During a logic signal on NPULSE-2 line 50, a defibrillation pulse is delivered between electrode 32 and electrode 28.

The output circuitry of the present invention includes two electrochemical capacitor banks for delivering defibrillation pulses to the electrodes. The first electrochemical capacitor bank includes electrochemical capacitors 56 and 58 of the present invention. The second electrochemical capacitor bank includes electrochemical capacitors 60 and 62 of the present invention. In FIG. 2, those capacitors are illustrated in conjunction with the high voltage charging circuitry 64, controlled by the control/timing circuitry 44 by means of a bi-directional control/data bus 66.

As illustrated, electrochemical capacitors 56, 58, 60 and 62 of the present invention are most preferably charged by means of high frequency, high voltage transformer 68. Other means of charging those capacitors are contemplated in the present invention, such as switched-mode power supplies and other types of DC-to-DC step-up converters. Proper charging polarities are maintained by means of diodes 70, 72 and 74. VCAP line 54 provides a signal indicative of the voltage on the electrochemical capacitor banks, and allows for control of the high voltage charging circuitry and for termination of the charging function when the stored voltage equals the programmed charging level. The details of the high voltage charging circuitry are not believed to be critical with regard to practicing the present invention. However, the circuitry illustrated is believed desirable in conjunction with the present invention as the disclosed configuration of the charging circuitry allows for equal charging of all four capacitors within the banks.

In other embodiments of the present invention, the first and second banks of capacitors may each contain mixtures of conventional and electrochemical capacitors, or electrochemical capacitors only may be contained in one bank of capacitors while the other bank of capacitors contains only conventional capacitors.

Pace/sense circuitry 78 includes an R-wave amplifier according to the prior art, or more advantageously as disclosed in U.S. Pat. No. 5,163,427 to Keimel entitled "Apparatus for Delivering Single and Multiple Cardioversion and Defibrillation Pulses," hereby incorporated by reference herein in its entirety. The present invention, however, is believed workable in the context of any known R-wave amplification system. Pace/sense circuitry 78 also includes a pulse generator for generating cardiac pacing pulses, which may also correspond to any known cardiac pacemaker output circuitry and includes timing circuitry for defining ventricular pacing intervals, refractory intervals and blanking intervals, under control of microprocessor 42 via control/data bus 81. Control signals triggering generation of cardiac pacing pulses by pace/sense circuitry 78 and signals indicative of the occurrence of R-waves, from pace/sense circuitry 78 are communicated to control circuitry 44 by means of a bi-directional data bus 81.

Pace/sense circuitry 78 is coupled to helical electrode 34 illustrated in FIG. 1 by means of conductor 36. Pace/sense circuitry 78 is also coupled to ventricular electrode 28, illustrated in FIG. 1, by means of conductor 82, allowing for bipolar sensing of R-waves between electrodes 34 and 28 and for delivery of bipolar pacing pulses between electrodes 34 and 28, as discussed above.

According to the present invention, an improved electrode material for an electrochemical capacitor for an implantable medical device such as a defibrillator may be made. The electrode material comprises at least 5 weight percent (and preferably at least 10 weight percent of an electrically conductive carbon having a surface area greater than 200 $m^2/g$ (and preferably greater than 500 $m^2/g$), a soluble salt, a non-aqueous liquid solvent and a gel-former.

The types of carbon that may be employed in the present invention include carbon black, active carbons and carbon fibers. Carbon blacks are carbons typically produced from the thermal decomposition or partial oxidation of various hydrocarbons. Carbon black can include acetylene black which has been widely used in battery electrode compositions. Active carbons are carbons typically produced from materials such as coconut shells or petroleum coke by thermal decomposition in the presence of steam. Carbon fiber is a carbon typically made from thermal oxidation and pyrolysis of materials such as polyacrylonitrile and rayon. The electrically conductive carbon can be, for example, activated carbon, carbon black, carbon fibers or mixtures of activated carbon, carbon black and carbon fibers. For example, some carbons store more energy because they have higher surface area but they may not have the highest conductivity. Other carbons may have a morphology that facilitates high discharge but may only store a limited amount of energy.

By combining two or more carbons, such as carbon black and activated carbon, the properties of the electrode may be optimized. Preferably, carbon is loaded into the electrode at a weight percent exceeding about 5% that is most preferably in the range of 10–30 weight percent. The most desirable carbon content will depend on the type of carbon, the type of soluble salt used and the type of liquid solvent used.

The soluble salt used in the electrode of the present invention can be any salt soluble in the solvent employed in the electrode to impart ionic conductivity to the electrode. For example, alkali metal salts such as the lithium salts $LiClO_4$, $LiAsF_6$, $LiPF_6$, $LiCF_3SO_3$, $LiN(CF_3SO_2)_2$ or $LiBF_4$, similar salts of sodium, potassium or magnesium could be used. Furthermore, alkaline earth salts, and organic substituted ammonium cation salts (e.g. $(C_2H_5)_4NBF_4$) or other organic substituted phosphonium and sulfonium salts may be used. The amount of soluble salt used in the electrode composition can vary widely depending on the specific salt used, however, an amount in the range of about 5 weight percent to 20 weight percent could generally be used.

The non-aqueous liquid solvent used in the electrode of the present invention can be an aprotic organic solvent which is a liquid at the temperature at which the electrochemical capacitor will be used. This can include, for example, the solvents listed in Dudley et al., Conductivity of electrolytes for rechargeable lithium batteries, Journal of Power Sources, 35 (1991) 59–82, which is incorporated herein by reference. Thus, ethylene carbonate (EC), propylene carbonate (PC), 2-methyl tetrahydrofuran (2MeTHF), sulfolane, triglyme and mixtures thereof such as EC/PC, 2MeTHF/EC/PC or sulfolane/triglyme could be used. Preferably, the solvent is a 1,3-dioxolane-2-one such as either ethylene carbonate or propylene carbonate and, most preferably, the electrolyte is a liquid mixture of ethylene carbonate and propylene carbonate.

The amount of solvent used in the electrode is preferably enough to just wet the other electrode components and allow them to be formed into the desired shape. Preferably, a portion of the soluble salt is first dissolved in the solvent and then the salt/solvent is combined with the conductive carbon to provide an intimate mixture of salt, solvent and carbon. Following forming of the electrode, excess solvent may be removed, for example, by contacting the electrode with materials which absorb the excess solvent.

The gel-former used to make the electrode of the present invention is a material capable of providing the electrode with a formable, cohesive network which immobilizes the carbon, salt and solvent. Preferably, it makes an electrode composition that is a rubbery solid at room temperature with only a relatively small amount of gel-former material in the composition. A polymer gel-former can be crosslinked after forming if additional structural strength is required. The gel-former used in the present invention is therefore preferably an acrylonitrile-based polymer although other polymers such as those found in Abraham, Li+-Conductive Solid Polymer Electrolytes with Liquid-Like Conductivity, J. Electrochem. Soc., V. 137, N. 5, May 1990 could also be used. Polymers such as polyvinylpyrrolidone (PVP), poly[(tetraethylene glycol)diacrylate] (PEGDA) and mixtures of such polymers may therefore could be used, as well as mixtures of such polymers with polyacrylonitrile.

To make electrodes with high amounts of carbon, the ingredients are preferably mixed from certain premixed components. First, the solvent is premixed into a stock solution which includes the solvent and dissolved salt. A portion of this liquid electrolyte stock solution is then premixed with the electrically conductive carbon in order to allow it to mix well with the other components of the electrode mixture. Preferably, the amount of stock solution added to the carbon is just enough to wet the carbon. A portion of the liquid electrolyte stock solution is also combined with the gel-forming polymer to provide a gelled electrolyte composition.

The gelled electrolyte composition is then added to the carbon premix and thoroughly mixed to provide the electrode composition of the present invention. Preferably, the components are heated during the mixing step to make it easier to provide a uniform mixture. Also, preferably, the final mixture should be degassed in a vacuum to remove entrapped gases and volatile impurities. The resulting mixture can then be formed into a film by casting or pressing methods. In a preferred method, the mixture is heated until it is flowable, and is then pressed between heated plates to provide an electrode of the desired thickness. Alternatively, one could press the electrode composition between polymer films or sheets which could then provide a support for the formed electrode material during subsequent transport, cutting or slitting operations.

The electrode material could also be used in a process to provide a continuous film of very thin electrode material by extrusion of the material between rollers and onto a support web. A conductive current collector can also be pressed onto the film to make a completed electrode structure suitable for use in electrochemical devices such as electrochemical capacitors. The electrode composition could also be diluted and prepared as solutions which can then be formed into thick or thin films by conventional techniques such as doctor blade casting, hot pressing, solvent casting, dip coating, spin coating, extrusion or silk screening.

Figure 3:
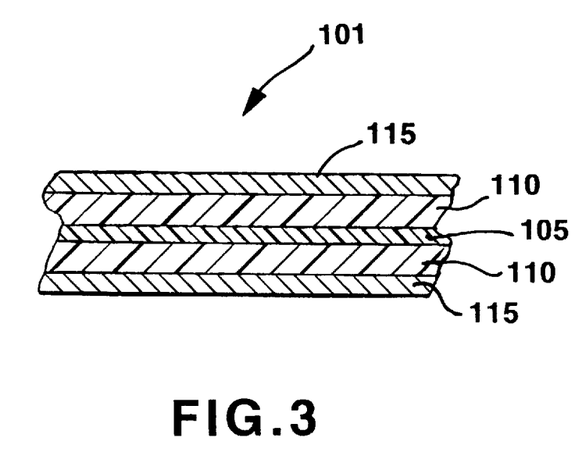
FIG. 3 is a cross sectional view of a single cell electrochemical capacitor made according to the present invention.

The electrode composition of the present invention can be used to make capacitors in a wide variety of capacitor shapes and sizes. For example, prismatic cells could be made by cutting out electrode and electrolyte sheet material and stacking them, as shown in FIG. 3. FIG. 3 shows a capacitor 101 made up of an electrolyte layer 105 interposed between and in contact with electrode layers 110 made according to the present invention and current collectors 115 in contact with the electrode layers 110.

Figure 4:
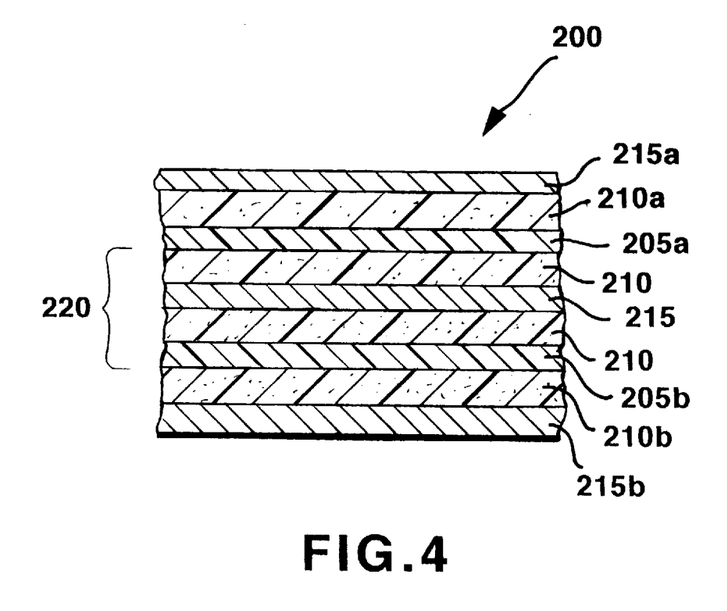
FIG. 4 is a cross sectional view of a multi-layer electrochemical capacitor made according to the present invention.

A prismatic, multi-layer capacitor could also be made by merely stacking together additional capacitor cells or by making a bipolar device such as that shown in FIG. 4. FIG. 4 shows a bipolar capacitor structure 200 which can be made by combining in sheet form a current collector layer 215 with electrode layers 210 on opposing faces of the current collector 215 and then applying in sheet form an electrolyte layer 205 to provide a subassembly sheet 220 including the foregoing layers. The subassembly sheet 220 can then be cut and stacked on top of each other in repetition until the desired number of layers are arrived at. In FIG. 3 only one such layer is shown. At the top of the stack an electrolyte layer 205a, an electrode layer 210a and a current collector top plate 215a are provided; and at the bottom of the stack, an electrode layer 210b and a current collector bottom plate 215b are provided. Electrical connections can then be made to the top plate 215a and bottom plate 215b.

In one embodiment of the present invention, a hermetically sealed implantable cardioverter comprises an electrochemical capacitor for storing a charge and means for delivering the charge stored in the capacitor to cardiac tissue. The capacitor further comprises a plurality of electrode layers, each electrode layer comprising electrically conductive carbon, at least one soluble salt, at least one non-aqueous liquid solvent and at least one polymer, and a plurality of ionically conductive electrolyte layers interleaved between the plurality of electrode layers, each electrolyte layer comprising at least one alkali metal salt and at least one polymer.

In another embodiment of the present invention, a hermetically sealed implantable cardioverter is provided that comprises an electrochemical capacitor for storing a charge, and means for delivering the charge stored in the capacitor to cardiac tissue. The capacitor further comprises an electrode assembly comprising a current collector, at least one soluble salt, at least one non-aqueous liquid solvent, at least one gel-former and an electrically conductive composition comprising at least about five weight percent electrically conductive carbon having a surface area greater than about 200 $m^2/g$, the composition being pressed onto the current collector. The electrochemical capacitor may form a multi-layer capacitor comprising a plurality of electrode layers, a plurality of electrolyte layers and a plurality of current collectors, all disposed in operative relationships respecting one another. The current collectors may be connected electrically in series or in parallel.

In yet another embodiment of the present invention, a hermetically sealed implantable cardioverter, is provided that comprises an electrochemical capacitor for storing a charge, and means for delivering the charge stored in the capacitor to cardiac tissue, the electrochemical capacitor being characterized in having a discharge response time less than about 1 second. The electrochemical capacitor may also be characterized in having a discharge response time less than about 0.1 second, less than about 0.01 seconds, or less than about 0.001 seconds.

Electrochemical capacitors of the present invention made according to a thin-film design may also have cells connected in series or parallel by methods well known in the art to provide high or low voltage devices. One such method is the use of an accordion-folded structure where thin films of electrode and electrolyte materials are made in a long strip and are folded in an accordion fashion to make a prismatic structure. Another efficient capacitor design is the spiral wrapped design which can also be made from strips of electrode and electrolyte materials rolled into a spiral.

The thickness of the formed electrode can be critical to many applications for the electrode in electrochemical capacitors. The thickness can affect the capacitance, energy density and discharge response time of the device. For example, a capacitor with the electrode composition of the present invention could be made to have the discharge response times set forth in Table 1 by providing electrodes of approximately the given thickness.

TABLE 1

| Response Time(s) | Nominal Electrode Thickness ($\mu$m) |
|---|---|
| 100 | 500 |
| 10 | 100 |
| 1 | 50 |
| .1 | 10 |
| .01 | 5 |
| .001 | 1 |

Preferably, therefore, the thickness of the electrode is less than about 50 $\mu$m for many electronics applications and most preferably less than about 5 $\mu$m for use in such devices as implantable cardiac defibrillators.

The following examples illustrate several embodiments of the present invention.

EXAMPLE 1

A gelled electrolyte material was made using 8% polyacrylonitrile, 40% propylene carbonate, 40% ethylene carbonate and 12% lithium triflate.

The solid lithium triflate and ethylene carbonate were dissolved into the liquid propylene carbonate with heating and stirring to make a stock liquid electrolyte solution. The polyacrylonitrile was powdered to facilitate dissolution and was combined with the stock liquid electrolyte solution. With continuous stirring, the material was heated to a temperature of 80°–140° C. The polyacrylonitrile dissolved abruptly, resulting in a highly viscous melt. Stirring was continued to ensure homogeneity. The melt was transferred to a vacuum oven held at a nominal 140° C. and was evacuated to withdraw any volatile impurities and gas bubbles. The material was then cooled to room temperature where it solidified into a rubbery, solid mass.

EXAMPLE 2

The gelled electrolyte composition of Example 1 was melted and cast into a film.

The composition was remelted and while hot was pressed between two flat, parallel glass plates at a force of 20–60 pounds. Shims and/or masking materials were used to control the thickness of the pressed material. When cooled to room temperature, the material was in the form of transparent sheets between 50–1000 mm thick. It was readily removed from the press. In order to remove excess liquid electrolyte from the pressed film, the film was stacked with alternating layers of paper towels and a pressing weight was applied to the stack for one half hour to 24 hours.

EXAMPLE 3

Electrodes were made from various carbons and the gelled electrolyte composition from Example 1.

Carbon samples were dried at 210° C. for 160 h and were thereafter maintained in a dry room. The carbon was then mixed in the desired proportions with the gelled electrolyte composition from Example 1 and was heated with stirring at about 120°–150° C. The hot mix was transferred to a vacuum oven at about 120°–150° C. and a vacuum was carefully applied to remove entrapped gasses and volatile impurities. The vacuum was maintained for about 30 minutes. Samples of the degassed material were poured while hot onto molds, flat metal sheets, plastic sheets or flat glass plates as desired and were pressed with a platen to reduce thickness as set forth in Example 2.

EXAMPLE 4

Electrodes were made from various carbons and the gelled electrolyte composition from Example 1 and the stock liquid electrolyte from Example 1.

Carbon samples were dried at 210° C. for 160 h and were thereafter maintained in a dry room. The carbon was then mixed in with the stock liquid electrolyte from Example 1 until the carbon appeared to be a "slightly moist" mix. A desired amount of the gelled electrolyte material from Example 1 was then melted at about 140° C. and the mixture of carbon and liquid electrolyte was added slowly with mixing until a desired consistency was achieved. Representative electrode compositions are set forth in Table 2. The mixture was transferred to a vacuum oven at about 120°–150° C. and a vacuum was applied for about 30 minutes. Samples were poured while hot onto a glass plate preheated to about 140° C. and were pressed by a second glass plate into films of about 50 $\mu$m thick.

TABLE 2

| Carbon | Liquid Electrolyte | Gelled Electrolyte |
|---|---|---|
| 5 g. Activated Carbon | 10.13 g. | 25.5 g. |
| 5 g. Carbon Fibers | 6.03 g. | 15.5 g. |
| 1.54 g. Acetylene Black | 10.77 g. | 12.1 g. |
| 2.8 g. Carbon Black | 25.5 g. | 22 g. |

EXAMPLE 5

Electrodes were made by combining carbons with different properties. 0.25 g. carbon black was added to 3.0 g. of the liquid electrolyte from Example 1. 0.85 g. activated carbon and 0.9 g. liquid electrolyte were added to the mixture. 0.5 g. of polyacrylonitrile was stirred into 3.1 g of the liquid electrolyte from Example 1 while heating to 100°–140° C. to obtain a thick, viscous solution. The carbon black and liquid electrolyte were combined with the polyacrylonitrile and liquid electrolyte slowly, with mixing. About 1 g. of additional liquid electrolyte was added to reduce the viscosity of the mixture. The mixture was then degassed as in Example 4 and cast into a film.

EXAMPLE 6

Single cell capacitors were made from electrolyte films made according to Example 2 and from electrodes made according to Example 4.

An electrolyte film cut into a disk shape was placed between two electrode films also cut into disk shapes. The cells were assembled in a dry room and clamped between inert metal foil electrode contacts.

EXAMPLE 7

A spiral wrapped cell capacitor was made from an electrolyte film made according to Example 2 and from electrodes made according to Example 4.

A long strip cell was made using aluminum foil as a current collector.

The arrangement of elements was:

Aluminum/Electrode/Electrolyte/Electrode/Aluminum/Insulator. The strip cell was spirally wound into a cylindrical shape. The resulting cell had a resistance of 1.5 ohms and could be charged to 5 volts.

EXAMPLE 8

A high voltage stack capacitor was made from electrolyte films made according to Example 2 and from electrodes made according to Example 4.

Electrode and electrolyte layers averaging about 300 $\mu$m in thickness were combined as set forth in Example 6 with a 2 cm$^2$ area. 25 of the cells were stacked in series in a single container to form a 125 volt capacitor. It was tested to 115 volts.

For purposes of the following claims, the term "cardioverter" is used in its generic sense, indicating that the devices claimed are intended to treat cardiac arrhythmias including, but not limited to, atrial and ventricular tachycardias and atrial and ventricular fibrillation.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts or the scope of the appended claims.

We claim:

1. A hermetically sealed implantable cardioverter, comprising:

(a) an electrochemical capacitor for storing a charge, and (b) means for delivering the charge stored in the capacitor to cardiac tissue, the capacitor further comprising a plurality of electrode layers, each electrode layer comprising electrically conductive carbon, at least one soluble salt, at least one non-aqueous liquid solvent and at least one polymer, and a plurality of ionically conductive electrolyte layers interleaved between the plurality of electrode layers, each electrolyte layer comprising at least one alkali metal salt and at least one polymer.

2. The cardioverter of claim 1, wherein the electrically conductive carbon contained in at least one of the plurality of electrode layers has a surface area exceeding about 200 m$^2$/g.

3. The cardioverter of claim 1, wherein the electrically conductive carbon comprises at least about five percent by weight of each electrode layer.

4. The cardioverter of claim 1, wherein the electrically conductive carbon is selected from the group consisting of activated carbon, carbon black, carbon fiber and mixtures thereof.

5. The cardioverter of claim 1, wherein the soluble salt is a lithium salt.

6. The cardioverter of claim 5, wherein the lithium salt is selected from the group consisting of LiClO$_4$, LiAsF$_6$, LiPF6, LiCF$_3$SO$_3$, LiN(CF$_3$SO$_2$)$_2$ and LiBF$_4$.

7. The cardioverter of claim 1, wherein the solvent is selected from the group consisting of ethylene carbonate, propylene carbonate, 2-methyl tetrahydrofuran, sulfolane, triglyme and mixtures thereof.

8. The cardioverter of claim 1, wherein the solvent comprises a mixture of ethylene carbonate and propylene carbonate.

9. The cardioverter of claim 1, wherein at least one of the plurality of electrode layers further comprises a gel former.

10. The cardioverter of claim 9, wherein the gel former is selected from the group consisting of polyacrylonitrile, poly(vinyl pyrrolidone), poly[(tetraethylene glycol) diacrylate], and mixtures thereof.

11. The cardioverter of claim 1, wherein the electrochemical capacitor is characterized in having a discharge response time less than about 1 second.

12. The cardioverter of claim 1, wherein the electrochemical capacitor is characterized in having a discharge response time less than about 0.1 seconds.

13. The cardioverter of claim 1, wherein each electrode layer is less than about 25 $\mu$m thick.

14. The cardioverter of claim 1, wherein each electrode layer is less than about 50 $\mu$m thick.

15. A hermetically sealed implantable cardioverter, comprising:

(a) an electrochemical capacitor for storing a charge, and (b) means for delivering the charge stored in the capacitor to cardiac tissue, the capacitor further comprising an electrode assembly comprising a current collector, at least one soluble salt, at least one non-aqueous liquid solvent, at least one gel-former and an electrically conductive composition comprising at least about five weight percent electrically conductive carbon having a surface area greater than about 200 m$^2$/g, the composition being pressed onto the current collector.

16. The cardioverter of claim 15, wherein the electrically conductive carbon is selected from the group consisting of activated carbon, carbon black, carbon fiber and mixtures thereof.

17. The cardioverter of claim 15, wherein the at least one soluble salt is selected from the group consisting of LiClO$_4$, LiAsF$_6$, LiPF$_6$, LiCF$_3$SO$_3$, LiN(CF$_3$SO$_2$)$_2$ and LiBF$_4$.

18. The cardioverter of claim 15, wherein the at least one solvent is selected from the group consisting of ethylene carbonate, propylene carbonate, 2-methyl tetrahydrofuran, sulfolane, triglyme and mixtures thereof.

19. The cardioverter of claim 15, wherein the at least one gel-former is a polymer selected from the group consisting of polyacrylonitrile, poly(vinyl pyrrolidone), poly[(tetraethylene glycol)diacrylate], and mixtures thereof.

20. The cardioverter of claim 15, wherein the electrochemical capacitor is a multi-layer capacitor comprising a plurality of electrode layers, a plurality of electrolyte layers and a plurality of current collectors, all disposed in operative relationships respecting one another.

21. The cardioverter of claim 20, wherein the current collectors are electrically connected in series.

22. The cardioverter of claim 20, wherein the current collectors are electrically connected in parallel.

23. The cardioverter of claim 15, wherein the electrode layer is less than about 25 $\mu$m thick.

24. The cardioverter of claim 15, wherein the electrode layer is less than about 50 $\mu$m thick.

25. A hermetically sealed implantable cardioverter, comprising:

(a) an electrochemical capacitor for storing a charge, and (b) means for delivering the charge stored in the capacitor to cardiac tissue, wherein the electrochemical capacitor is characterized in having a discharge response time less than about 1 second.

26. The cardioverter of claim 25, wherein the electrochemical capacitor is characterized in having a discharge response time less than about 0.1 second.

27. The cardioverter of claim 25, wherein the capacitor further comprises a plurality of electrode layers.

28. The cardioverter of claim 27, wherein each electrode layer is less than about 25 μm thick.

29. The cardioverter of claim 27, wherein each electrode layer is less than about 50 μm thick.

30. The cardioverter of claim 27, wherein each electrode layer comprises electrically conductive carbon, at least one soluble salt, at least one nonaqueous liquid solvent and at least one polymer.

31. The cardioverter of claim 27, wherein at least one of the plurality of electrode layers further comprises a gel former.

32. The cardioverter of claim 27, wherein a plurality of ionically conductive electrolyte layers are interleaved between the plurality of electrode layers, each electrolyte layer comprising at least one alkali metal salt and at least one polymer.

33. The cardioverter of claim 29, wherein the electrically conductive carbon contained in at least one of the plurality of electrode layers has a surface area exceeding about 200 $m^2/g$.

34. The cardioverter of claim 29, wherein the electrically conductive carbon comprises at least about five percent by weight of each electrode layer.

35. The cardioverter of claim 29, wherein the electrically conductive carbon is selected from the group consisting of activated carbon, carbon black, carbon fiber and mixtures thereof.

36. The cardioverter of claim 29, wherein the solvent is selected from the group consisting of ethylene carbonate, propylene carbonate, 2-methyl tetrahydrofuran, sulfolane, triglyme and mixtures thereof.

37. The cardioverter of claim 29, wherein the solvent comprises a mixture of ethylene carbonate and propylene carbonate.

38. The cardioverter of claim 35, wherein the lithium salt is selected from the group consisting of $LiClO_4$, $LiAsF_6$, LiPF6, $LiCF_3SO_3$, $LiN(CF_3SO_2)_2$ and $LiBF_4$.

39. The cardioverter of claim 37, wherein the gel former is selected from the group consisting of polyacrylonitrile, poly(vinyl pyrrolidone), poly[(tetraethylene glycol) diacrylate], and mixtures thereof.

40. The cardioverter of claim 29, wherein the soluble salt is a lithium salt.

* * * * *